United States Patent Office 3,159,374
Patented Dec. 1, 1964

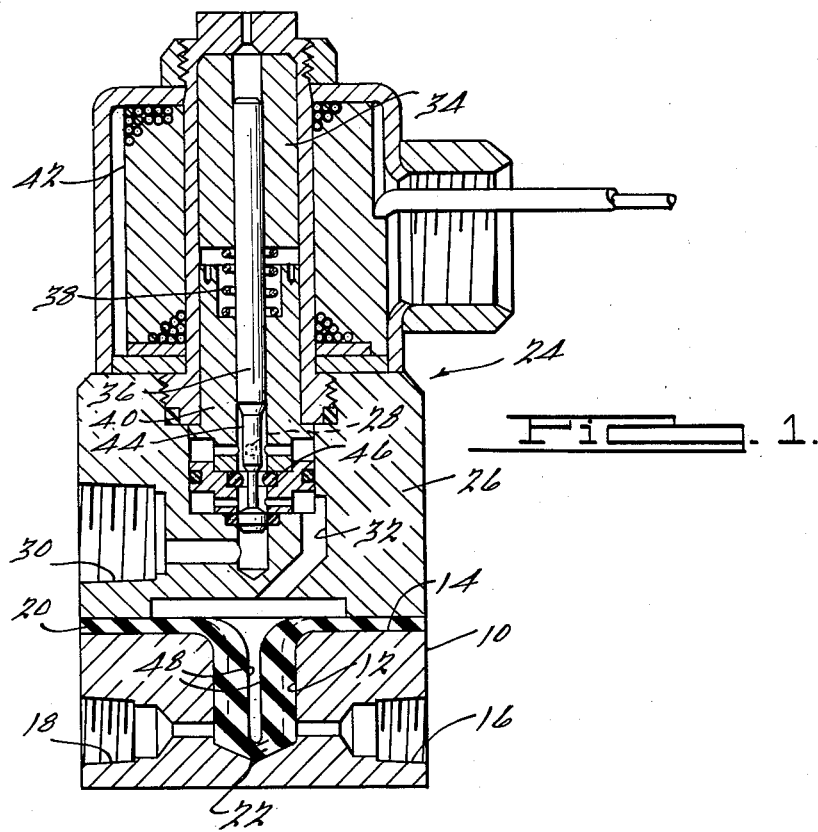
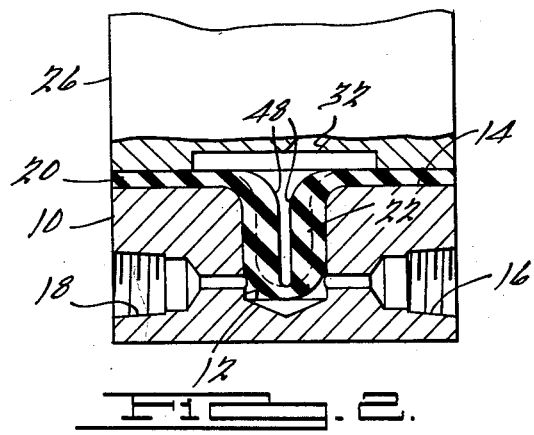

3,159,374
FLEXIBLE DIAPHRAGM CONTROL VALVE
Kenneth K. Kroffke, Parma, Ohio, assignor to Airmatic Valve, Inc., Cleveland, Ohio, a corporation of Ohio
Filed Apr. 5, 1962, Ser. No. 185,345
2 Claims. (Cl. 251—30)

This invention relates to a flow control valve and has particular reference to a flow control valve employing a flexible diaphragm which has an inflatable and deflatable portion under the control of a pilot valve means to open and close a fluid flow path through the valve body.

A principal object of the invention is to provide a new and improved flow control valve.

A further object of the invention is to provide a flow control valve in which a flexible diaphragm is utilized to open and close a fluid flow path through a valve body.

Another object of the invention is to provide a valve of the type described which is economical to manufacture and efficient in operation.

Other and further objects of the invention will be apparent from the following description and claims and may be understood by reference to the accompanying drawing, which by way of illustration shows a preferred embodiment of the invention and what I now consider to be the best mode of applying the principles thereof. Other embodiments of the invention may be used without departing from the scope of the present invention as set forth in the appended claims.

In the drawing:

FIG. 1 is a sectional view through a valve constructed according to the present invention; and FIG. 2 is a fragmentary view similar to FIG. 1 showing the valve in its open position.

A valve body 10 is provided with a valve chamber or cavity 12 opening from a surface 14 of the valve body 10. The valve body is also provided with an inlet port 16 and an outlet port 18, each of which intersects and communicates with the valve chamber 12 adjacent the lower end thereof. Preferably the inlet and outlet ports 16 and 18 intersect the valve chamber 12 at diametrically opposed points.

A flexible diaphragm 20 overlies the surface 14 on the valve body 10 and is provided with a central distended portion 22 which extends into the valve chamber 12. A pilot valve indicated generally at 24 is mounted on the surface 14 of the valve body 10, and the peripheral portion of the diaphragm 20 is thereby clamped between the block 26 forming a part of the pilot valve 24 and the valve body 10.

The pilot valve 24 may be a three-way solenoid type valve having an inlet port 28, an exhaust port 30, and a work port 32. A plunger 34 carrying a stem 36 is urged in one direction by a spring 38 which is confined between the plunger 34 and a core 40. The plunger is moved in the opposite direction upon energization of the coil 42 of the solenoid to shift the stem 36. When the plunger 34 is in the position shown, the inlet port 28 and the work port 32 are in communication so as to supply fluid under pressure through the work port 32 to inflate the central portion 22 of the diaphragm 20 so that the latter completely fills the valve chamber 12 to sealingly engage the walls of the chamber 12 around the inlet and outlet ports 16 and 18, thereby closing the communication between such ports. When the plunger is shifted downwardly by energization of the solenoid, the portion 44 of the stem 36 engages the seal 46 to close the communication between the inlet 28 and the work port 32 and at the same time establishes communication between the work port 32 and the exhaust port 30. The portion 22 of the diaphragm thereupon contracts to the position shown in FIG. 2, thereby establishing communication between the inlet 16 and the outlet 18 in the valve body 10 through the chamber 12.

The distended portion of the diaphragm 20 may be provided with a pair of ribs 48 on its inner surface with each of the ribs aligned with or lying in the plane of one of the ports 16 or 18 so as to reinforce the diaphragm and prevent any possibility of extrusion thereof into the ports 16 or 18 when the diaphragm is inflated.

With the construction disclosed, the flexible diaphragm provides a very efficient and inexpensive valve member to close off communication between the inlet and outlet ports 16 and 18. The valve body 10 and the diaphragm 20 comprise a relatively inexpensive unit which may be mounted on a conventional pilot valve member such as the solenoid operated valve 24 shown in the drawing. However, other types of pilot valves may be employed for inflating the diaphragm 20, and the valve 24 shown is merely illustrative of one type of valve suitable for this purpose.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A flow control valve comprising a valve body having a cavity opening from one surface thereof and inlet and outlet ports opening into the wall of said cavity and communicating with each other through said cavity, a solenoid operated valve mounted on said one surface of said valve body and having a work port therein opposite said cavity, a flexible diaphragm clamped at its periphery between said solenoid valve and said valve body, said diaphragm having a distended central portion extending into said cavity and engaging the wall thereof so as to be confined against radial expansion, said engagement of said diaphragm and said cavity wall normally terminating short of the openings of said ports into said wall so as to provide said communication between said ports, said solenoid valve being operable to supply fluid under pressure through said work port to inflate said central portion of said diaphragm to cause the latter to be axially extended to sealingly engage the wall of said cavity around said inlet and outlet ports to close the communication therebetween.

2. A valve according to claim 1 wherein said central portion of said diaphragm is provided with a pair of ribs on the surface thereof exposed to said fluid pressure, said ribs being aligned with said inlet and outlet ports to prevent extrusion of said diaphragm into said ports.

References Cited in the file of this patent

UNITED STATES PATENTS

| 2,572,175 | McPherson | Oct. 23, 1951 |
| 2,840,339 | Price | June 24, 1958 |
| 2,948,298 | Gardner | Aug. 9, 1960 |
| 3,057,594 | Allen | Oct. 9, 1962 |

FOREIGN PATENTS

| 1,222,483 | France | Jan. 25, 1960 |